United States Patent [19]

Blandin et al.

[11] Patent Number: 5,277,706
[45] Date of Patent: Jan. 11, 1994

[54] METHOD OF AND AN APPARATUS FOR FORMING FIBRES

[75] Inventors: Yannick Blandin; Daniel Sainte-Foi, both of Clermont; Francis Mosnier, Coye la Foret, all of France

[73] Assignee: Isover Saint-Gobain, Courbevoie, France

[21] Appl. No.: 901,223

[22] Filed: Jun. 19, 1992

[30] Foreign Application Priority Data

Jun. 20, 1991 [FR] France ................................ 91 07561

[51] Int. Cl.$^5$ ............................................. C03B 37/04
[52] U.S. Cl. ............................................. 65/6; 65/14
[58] Field of Search ................ 65/6, 14; 264/8; 425/8

[56] References Cited

U.S. PATENT DOCUMENTS

| | | | |
|---|---|---|---|
| 3,215,514 | 11/1965 | Levecque et al. | 65/6 |
| 3,265,483 | 8/1966 | Garrison et al. | 65/14 |
| 3,785,791 | 1/1974 | Perry | 65/14 |
| 4,302,234 | 11/1981 | Guffrey et al. | 65/14 |
| 4,303,430 | 12/1981 | Houston | 65/6 |
| 4,478,624 | 10/1984 | Battigelli et al. | 65/4.4 |
| 4,601,742 | 7/1986 | Kaveh | 65/14 |
| 4,678,490 | 7/1987 | Miller et al. | 65/14 |

FOREIGN PATENT DOCUMENTS 2211408 7/1974 France .

Primary Examiner—Robert L. Lindsay
Attorney, Agent, or Firm—Oblon, Spivak, McClelland, Maier & Neustadt

[57] ABSTRACT

The invention relates to techniques for forming fibres from glass or other thermoplastics materials by internal centrifugation associated with gaseous drawing at high temperature. The material to be converted to fibres is poured into a centrifuge, the peripheral face of which is pierced with a vast number of orifices from which the material is sprayed in the form of filaments drawn out into fibres and entrained by a flow of gas at elevated temperature and velocity and directed along the periphery of the centrifuge, cross-wise to the direction in which the fibres are projected and channelled by a layer of cold gases enveloping it which, according to the invention, is formed over the entire perforated height of the peripheral face by diverging individual jets which combine again shortly after the lowest row of orifices in the peripheral face.

10 Claims, 3 Drawing Sheets

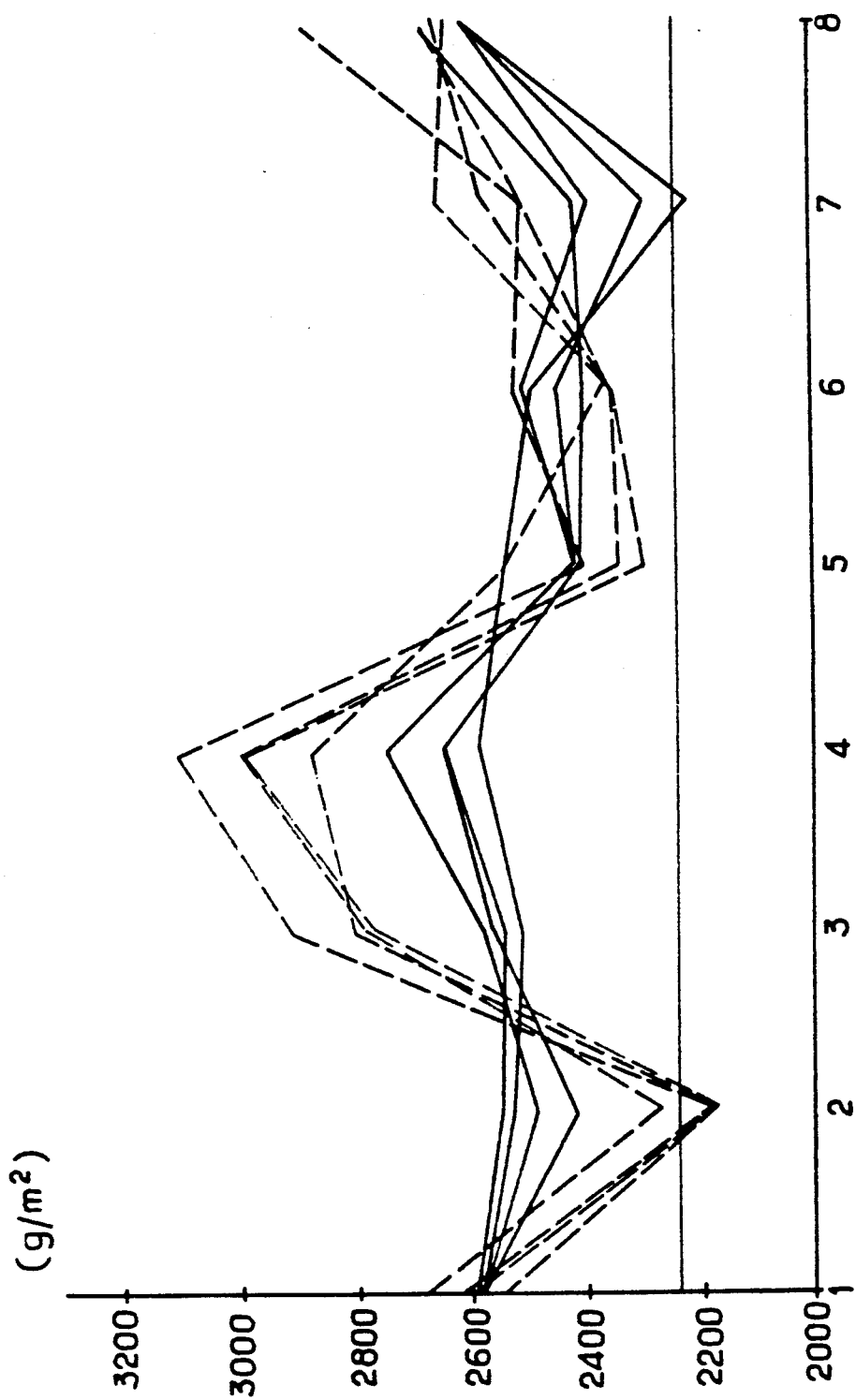
FIG_7

METHOD OF AND AN APPARATUS FOR FORMING FIBRES

BACKGROUND OF THE INVENTION

The invention relates to the techniques for forming fibres from glass or other thermoplastics materials by an internal centrifugation process associated with a drawing by a high-temperature flow of gases. It is applied particularly to the industrial production of glass wool intended for use for example in the composition of heat and/or sound insulating products.

The fibre-forming process to which the invention relates consists in introducing a stream of molten glass into a centrifuge, also referred to as a fibre-forming platform, turning at high speed and provided on its periphery with a very large number of orifices through which the glass is sprayed in the form of filaments under the effect of centrifugal force. These filaments are then subjected to the action of an annular drawing current at elevated temperature and velocity flowing along the wall of the centrifuge which thins them out and converts them to fibres. Within the meaning of the invention, the term 'elevated temperature and velocity' is understood to refer to a temperature at least in excess of 500° C. and an annular flow velocity greater than or equal to 50 m/s. The fibres formed are entrained by this gaseous drawing current to a receiving device which quite generally consists of a strip which is permeable to gases. This method has been the subject of numerous improvements, including particularly those disclosed in the patents U.S. Pat. No. 2,991,507, FR-A-2 147 765, FR-A-2 459 783, FR-A-2 443 436, EP-A-91 381 and EP-A-91 866.

Although the velocity of the gaseous drawing current is very high and systematically greater than the velocity at which the filaments are projected, the kinetic energy in the fibres is sufficient that many of them penetrate the gaseous drawing current which surrounds the centrifuge to a thickness of just a few millimeters. This drawing current then spreads out just below the centrifuge which has the effect of dispersing the fibres over a wide surface area. Finally, these fibres change course to fall onto the receiving belt situated a few meters below. Thus, the receiving belt intercepts the fibres dispersed in a cylindrical torus having a diameter which is small in relation to the width of the belt, which makes it difficult to achieve a properly uniform distribution of the fibres over the belt.

Furthermore, the thermal balance in the centrifuge is more often than not provided by induction heating using an annular inductor through which an electric current passes. Maximum efficiency is achieved when this annular inductor is very close to the centrifuge. As the centrifuges used are preferably centrifuges with no bottom, this inductor can only be installed by disposing it just outside the centrifuge, in a concentric manner. Therefore, all that is left for passage of the fibres is a relatively narrow space but this must of necessity be retained in order to avoid the inductor constituting an obstacle which would obviously impair the quality of the end product and in any case it could not function properly for a long time because it would become blocked by the fibres striking and adhering to it.

To remedy this problem, it is known to confine the gaseous drawing current by means of a layer of cold gases enveloping and channelling it in a suitable fashion. This gaseous layer is produced by a blower ring surrounding the annular burner. The cold air makes it possible furthermore to assist the cooling of the fibres, the mechanical strength of which is thus improved by a heat-hardening effect.

This gaseous layer is generated for example by a blower ring similar to that described in U.S. Pat. No. 2,991,507, that is to say it is constituted by an annular tube provided with a circumferential slot or a series of orifices which are close to one another, the divergence of the jets ensuring continuity of the fluid barrier formed not later than at the height of the first row of orifices of the centrifuge, these rows being systematically counted from top to bottom by men skilled in the art. Thus, a sealing-tight barrier is formed which cannot be traversed by the fibres, which means that these latter are channelled.

Nevertheless, this confinement of the fibre layer does not resolve the problems of fibre distribution and in particular the problems due to the formation of tufts by tangling of the fibres. Before referring to the tuft formation again, it must be stressed that these lay behind many faults which are observed in the end products.

Firstly, these tufts constitute a locally heterogeneous fibre distribution and the greater the length of the tufts, the more noticeable the fault. The tuft has a tendency to become rolled onto itself and, by becoming so accumulated, to leave areas which are fibre deficient. In these areas, the product has a lesser mass per unit of surface area which locally changes the properties of the product. To guarantee a minimum performance level, therefore, it is necessary to compensate for these locally fibre deficient areas by providing an excess of fibres which renders the cost of the product much greater.

Furthermore, the orientation of the fibres in the tufts differs from the general orientation of isolated fibres which may itself differ from the orientation which is desired in the end product. Therefore, the tufts will complicate the control of this final orientation which will in particular affect the insulating properties, the propensity for delamination and the resistance to crushing.

Furthermore, these tufts often form very high up in the fibre-forming and receiving hood before the fibres have been sprayed with binder. If the fibres are not properly isolated when the glue is applied, the distribution of the binder is not completely homogeneous and the fibres which are not thus sized are inclined to show up in the end product in the form of white spots which contrast with the fibres coloured by the binder. The appearance of the product is not greatly affected but above all certain mechanical properties such as for example the tensile strength, the resistance to fibre tearing, the rigidity, the resumption of former size and the aptitude for cutting will all be affected.

All these parameters play a more or less important part according to the type of products which are generally classified as light products—in which the density is less than 25 or even 15 kg/m$^3$—generally available in the form of rolls, or heavy products—the density of which is typically greater than 30 kg/m$^3$ and which are often subject to conditions of use which entail good mechanical strength. It must furthermore be stressed that although the properties desired for heavy or light products may differ only slightly, it is desirable to have polyvalent production lines, in other words lines having means which tend to resolve the problems posed at the most upstream point possible and not purely palliatives which remedy only a few defects which are specific to heavy or alternatively light products.

Thinking along these lines, therefore, the solution is not to be found solely in mechanical or pneumatic distributor means such as those described in the patents EP-A 69 321 and EP-A 125 963 and which set out to cause a movement aimed at balancing the fibre torus. Indeed, such means are only effective from the point of view of the final distribution of the surface masses but not in terms of the actual tufting and they are quite particularly inappropriate with regard to long tuft problems.

It should be noted furthermore that such means often require prolonged and delicate adjustment which can only be carried out by skilled personnel and which must furthermore be repeated whenever there is a change in production. Furthermore, it must be stressed that the difficulty of such adjustment tends to make it virtually impossible to isolate the factors involved in the mechanisms as a whole, in the blower ring which in particular plays a certain part in the process of forming fibres and tufts, inseparably supplementing its role of confinement of the fibre layer.

SUMMARY OF THE INVENTION

In the fibre-drawing process which is the object of the invention, various considerations referred to in detail in EP-B-91 866 make it possible to assume that even though the fibre-drawing process is obviously a complex phenomenon entailing movements of the centrifuge and of the heated drawing gas current, the most probable reducing hypothesis is that it is accomplished by an essentially mechanical effect, since the filament is on the one hand "attached" to the centrifuge and is on the other drawn out by friction exerted by the gaseous flow. The elevated temperature of this latter furthermore makes it possible to maintain the filament in a state of fluidity which is appropriate to drawing it out. But this mechanical hypothesis does of course have a limit because the thinned out filaments are made fragile by their impact against the gaseous current and against one another—the density to which the centrifuge is pierced with spinnerets typically being around 15 to 50 per square centimeter, it is obvious that the impacts are numerous. Furthermore, the fluid barrier generated by the blower ring suddenly cools the fibres and slows down the drawing process. But furthermore it appears that fibres rebound against it and are sent back in the direction of filaments which are in course of being drawn out which will make it easier for the fibres to become entangled.

In order the better to understand what may be the roles played by the blower ring, it may be interesting to refer to other fibre-drawing processes which have much in common with the method described here but which are easier to interpret because they do not have a drawing burner so that the ring acts on filaments and not on fibres or on a mixture of fibres and filaments.

The first of these methods is disclosed in U.S. Pat. Nos. 4,302,234 and 4,303,430 and consists of a method of drawing out fibres by internal centrifugation and a cold gaseous drawing process. In this case, the filaments projected by the centrifuge are possibly maintained at temperature by a burner with wide lips which generates a gaseous current which is heated but which is not of a very high velocity. The gaseous current maintains the centrifuged filaments in a plastic condition without participating directly in the process of drawing them out. On the other hand, this drawing out is accomplished by means of separate turbulent gas jets emitted by a blower ring in which the means of producing the jets are disposed at a pitch of approx. 50 mm.

The second method which may be mentioned is described in U.S. Pat. No. 4,058,386 which is presented as a fibre-forming method involving pure centrifugation. In this case, the filaments are prepared from a centrifuge in which there are orifices from 3 to 10 times smaller than in the previously mentioned fibre-drawing processes, so that the centrifugal force is sufficient directly to obtain the final diameter with no need for an additional drawing stage. On the other hand, these filaments have to be redirected to the receiving means and then cut. This operation is accomplished by a blower ring comprising circumferentially spaced nozzles: the filaments pass through calm zones between two jets and then, by reason of the rotation of the centrifuge, they are struck by a jet and are broken.

In the first case, with relatively coarse filaments, the blower ring has thus essentially a friction drawing action, the friction being reinforced by the turbulent nature of the jets. In the second case on the other hand, with filaments which have already been thinned out, the blower ring essentially has the effect of cutting the filaments. It is therefore clear that the purpose of the blower ring is a function of the process of forming and drawing out the fibres.

The authors of the present invention have set out to study a blower ring for intermittent jets for the process of forming fibres by centrifugation and hot gaseous drawing in order to establish whether one or other of the advantages attributed to the rings of the art applied to other fibre-drawing methods was verified.

First of all, it must be noted that such a study could a priori only be purely theoretical and have no industrial application. Indeed, in the two aforementioned processes, the blower ring acts on filaments which are still held by one end in the centrifuge, which may thus be likened to threads of infinite length. The action of the jets on the blower ring is therefore directly dependent upon rotation of the centrifuge. In the method of fibre formation entailing internal centrifugation and heated gaseous drawing, the blower ring on the other hand acts on the fibres which for the most part are not bound to the centrifuge. Furthermore, it is sufficient to stop the blower ring for a few moments to establish that the gaseous drawing current is sufficient for forming fibres and for entraining them to the receiving means, even though of course one is then rapidly confronted with problems of distribution and passage through the annular inductor. Under these conditions, one might expect that a blower ring comprising jets, not sealing-tight at the height of the centrifuge, will "allow" a large number of fibres to pass through and will be totally ineffective in its role of channelling the layer of fibres.

Nevertheless, the authors of the present invention were surprised to find that very good results are obtained if one proceeds with a blower ring the jets of which are individual over the entire perforated height of the peripheral face of the centrifuge and fuse at a height which is close to but which is lower than the height of the last row of orifices in the peripheral face.

Generally speaking, the invention proposes a method of forming fibres from glass or other thermoplastics material derived from the process known from the patent FR-A-2 443 436 or even from the patent EP-A-91 866, in other words a method of drawing out fibres by internal centrifugation and gaseous drawing at high temperature in which the material from which the fibres are to be formed, in the drawable state, is poured into a centrifuge, rotating about a substantially vertical axis, of which the peripheral face is pierced by a very large number of orifices from which the material is projected in the form of filaments which are immediately drawn out into fibres and are entrained towards a receiving means by a stream of gases at elevated temperature and velocity directed along the periphery of the centrifuge cross-wise to the direction in which the fibres are projected, this gaseous drawing current which entrains fibres being channelled by an enveloping layer of cold gases formed over the entire perforated height of the peripheral face by diverging individual jets, the said jets combining shortly after the final row of orifices in the peripheral face, these rows being counted from the top downwardly.

Under these conditions, it is apparent that the layer of cold gases sufficiently channels the gaseous drawing current to avoid the layer of fibres expanding too closely below the centrifuge and from this point of view the mode of operation is apparently very close to that obtained with a continuous sealing-tight layer. For all that, this surprising way of functioning is only verified if the gaseous layer is only intermittent at the height of the perforated face of the centrifuge and becomes continuous shortly after the last row of orifices, for example at the level of the bottom of the peripheral face.

Two jets are considered as combined with effect from the place where their frontal surfaces are tangent, these frontal surfaces being defined, according to the fluids mechanics series, as being the surfaces which define any space occupied by the moving gas or in other words by the place at which all points at which the velocity component according to the jet flow axis is zero or at least negligible compared with the velocity of the medium where the jet is flowing, the jets here being considered in their principal region, at a time when they can be considered as emanating from an infinitely small punctiform source.

In practice, good results are obtained when the jets combine at approx. 20 mm below the last row of orifices, which corresponds virtually to the level of the electromagnetic inductor when this latter is in use. In any case, to ensure proper functioning of this latter, the level at which the jets combine will preferably not be below the bottom level of the inductor.

The individualised jets according to the invention are preferably emitted at a high velocity, preferably a velocity which is not less than 250 m/s at the height of the jet generating means. Between two jets, the velocity of the gases is normally substantially nil but negative velocity values are likewise acceptable when they correspond to the presence of return currents.

One absolutely remarkable effect of the blower ring for individualised jets according to the invention is that it results in less tufting at the level of the centrifuge, which can be observed at first hand and above all is verified by the measured performance of the end products. Many hypotheses may be put forward in order to explain this phenomenon and the very fact that it is probable that these explanations do not take into account all the phenomena produced and that the interdependence of multiple parameters influences the end products complicates any interpretation.

The first hypothesis would be that of a shortening of the fibres. Indeed, in the fibre-drawing process disclosed here, the filaments are thinned out by the annular gaseous drawing current and are normally broken. Nevertheless, it can happen that exceptionally long filaments are formed before being broken and that these long fibres—about 10 cm or more in length for example—will quite naturally have a tendency to become rolled up into tufts which, as they form, will pick up other isolated fibres. With a blower ring according to the invention, it is probable that a mechanism close to that described in U.S. Pat. No. 4,058,386 may occur and that these few long filaments may penetrate the cold gaseous layer in between-jet zones before being abruptly broken by a jet.

On the other hand, the fibres already formed would for the most part be entrained by the gaseous drawing current which would explain the "sealing-tight" character of the intermittent layer. Furthermore, this effect can possibly be placed under drawing conditions which are relatively less violent if a gas-drawing temperature and drawing burner pressure are chosen solely as a function of the aim to achieve fineness in the fibres independently of their lengths which are essentially controlled by the blower ring.

The second hypothesis linked to the first is that this breakage would not occur without being preceded by further drawing due to the traction exerted by these filaments during acceleration so that the fibres of a given fineness might be obtained with a relatively lesser drawing burner pressure. Thus, one would restrict the turbulent phenomena engendered by the drawing burner and consequently reduce tufting.

Another object of the present invention is an apparatus for forming fibres of glass or other thermoplastics materials and comprising a centrifuge rotating about a substantially vertical axis and of which the peripheral face is pierced by a vast number of orifices, an annular drawing burner and a blower ring comprising elements for generating diverging individualised jets spaced apart by $d = 2 h \times tg\alpha$ in which $\alpha$ represents the angle of divergence of the jets or more precisely the angle between the central axis of symmetry of the jet and the asymptotic curve at its frontier and h represents a distance comprised between once and at most twice and preferably at most one and a half times the height measured between the bottom of the said jet generating elements and the last row of orifices in the peripheral face. Preferably, too, h exceeds this measured height by about 20 mm.

Once the spacing of the jets has been determined, the blower ring according to the invention may be constructed in various ways. In a first alternative embodiment, the simplicity of which is its main advantage, the blower ring is constituted by a simple tubular ring in which orifices are made, their diameter being for example comprised between 2 and 3 mm. In this alternative embodiment, the blower ring according to the invention therefore does not differ from the prior art ring according to U.S. Pat. No. 2,991,507 save by the spacing between the orifices and the diameter of these increased by 50 to 100%.

In a second alternative embodiment, the blower ring may be constituted by a series of nozzles fed by a storage tank at a distance from the centrifuge in order to encourage the induction of outside air by the blower ring.

In a quite particularly preferred embodiment of the invention, the blower ring consists of a tubular ring the orifices of which are provided with nipples fixed for instance by welding and made from a non-ferromagnetic material in order to avoid any interference with the electromagnetic induction process. By permitting a prolonged guidance of the jets, the nipples are conducive to greater stability of the conditions under which the individualised jets are emitted and therefore the regularity of functioning of the blower ring is favourably affected.

BRIEF DESCRIPTION OF THE DRAWINGS

Further details and advantageous characteristic features will emerge from the description given hereinafter with reference to the appended drawings in which:

FIG. 6 is a sectional view of a ring with nipples and FIG. 7 is a cross-section illustrating the transverse distribution of the product.

DETAILED DESCRIPTION OF THE PREFERRED EMBODIMENTS

Figure 1:
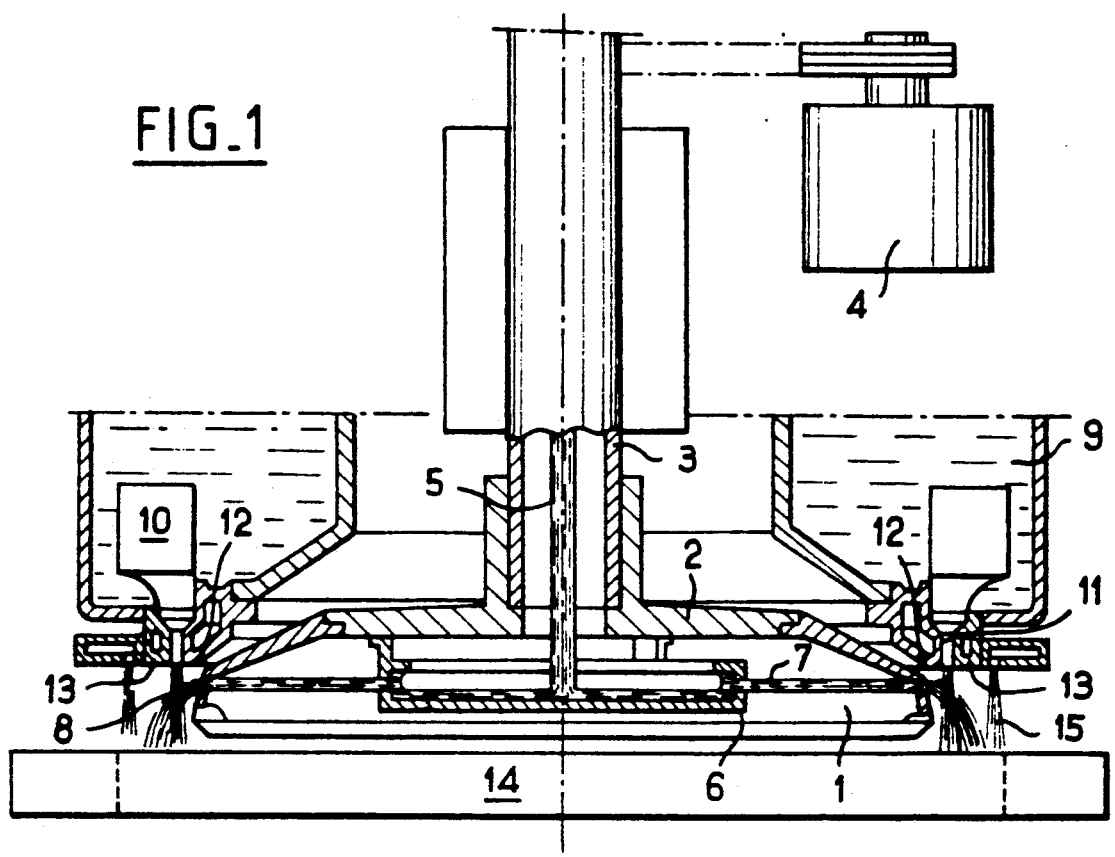
FIG. 1 is a diagrammatic cross-section through all the main elements involved in an apparatus for drawing out fibres by internal centrifugation and drawing by a gaseous current at elevated temperature and velocity.

FIG. 1 shows very diagrammatically a fibre-producing installation capable of carrying out the invention and, obviously with the exception of the blower ring, in accordance with the teaching of the patent EP-A-91 866 for example. This installation consists essentially of a bottomless centrifuge 1 the peripheral face of which is pierced by a vast number of orifices, fixed to a hub 2 mounted on a vertical rotary shaft 3 driven by a motor 4. The stream of molten glass 5 feeds the centrifuge by passing through the hollow shaft 3 and it flows into a solid-bottomed basket 6 provided with a cylindrical wall in which there are a small number of relatively large orifices, for example orifices with a diameter of around 3 mm, by virtue of which the molten glass is distributed in the form of primary streams 7 which are directed at the inside of the peripheral face from which under the effect of centrifugal force, the streams are expressed in the form of filaments 8.

The centrifuge is surrounded by an annular burner 9, in this case with a water-cooled metal casing defining a combustion chamber 10 which communicates with a pipe 11 forming the drawing current. The pipe 11 is formed by inner and outer lips 12 and 13 likewise cooled and discharging just above the peripheral wall of the centrifuge.

Just below and concentrically of the centrifuge there is an annular inductor 14 which helps to maintain the thermal balance of the burner, particularly to compensate for the relative coldness of the bottom of the peripheral face which is less heated by the drawing gases because it is more remote from the lips 12 and 13 of the annular burner. Further details concerning this annular conductor are to be found particularly in the patent U.S. Pat. No. 3,077,092.

Figure 2A:
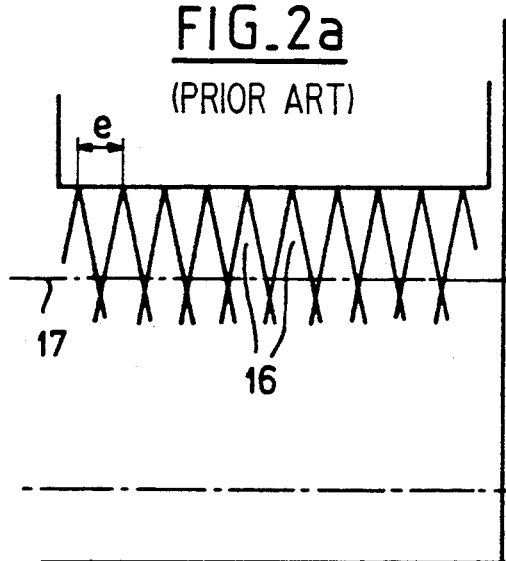
FIG. 2 shows two diagrams illustrating the principle of a blower ring according to U.S. Pat. No. 2,991,507 (FIG. 2a) and according to the invention (FIG. 2b)

The blower ring 15 concentric with the annular burner emits a current of cold air at a temperature substantially close to ambient temperature. FIG. 2a shows the geometry of the jets in a blower ring according to the prior art, for example according to U.S. Pat. No. 2,991,507: thus, the jets 16 are emitted by orifices which are very close to one another—for example with a distance e between centres of 7.4 mm for orifices 1.5 mm in diameter and at a sufficiently great distance from the first row of orifices, here shown diagrammatically by a broken line 17 so that the jets are mixed at its height and then form a continuous layer. In the case according to the invention, on the other hand, shown in FIG. 2b, the endeavour is to preserve to the maximum degree the individuality of the jets at the height of the perforated face of the centrifuge, which is why the orifices in the crown may be somewhat lowered and the jets emitted very close to the first row—an arrangement which produces more powerful jets, the maximum velocity being achieved at emission. Furthermore, the orifices are markedly more remote (being for example disposed with a distance e' between centres of 25 mm for a perforation diameter of 2.5 mm) so that the jets only combine after having travelled a distance close to 60 mm and are therefore still individual at the height of the last row of orifices in the perforated face of the centrifuge, here shown diagrammatically by the line 18. On the other hand, this individuality disappears close to the inductor 19 and from then on the layer is continuous.

Figure 2B:
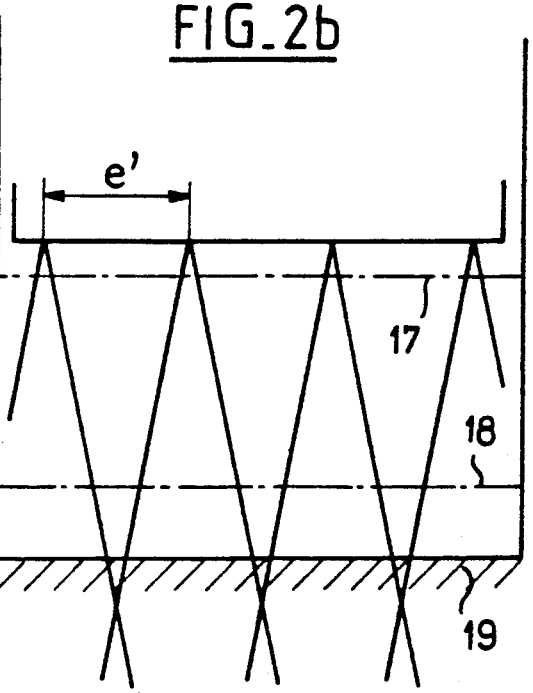
Figure 3:
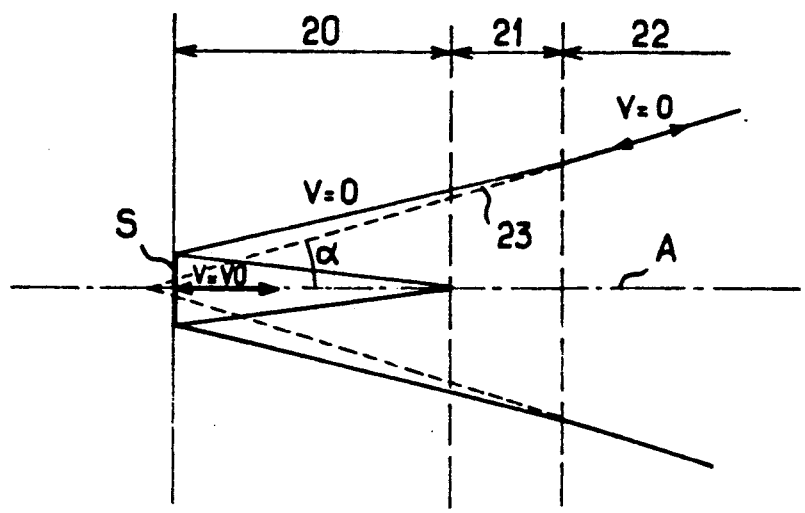
FIG. 3 is a diagram of a gas jet.

In FIGS. 2a and 2b, the jets are shown diagrammatically as emanating from an infinitely small punctiform source whereas in reality they are generated by a source having a cross-section of a few square millimeters. Nevertheless, in so far as the crucial point of the invention relates to the junction of two jets and in so far as this is situated far from the zone of emission, this approximation is no problem as can be seen from FIG. 3 which shows a diagram of a jet obtained from a source S producing a jet accepting an axial symmetry about the axis A. As the science of fluid mechanics teaches us, this jet 3 comprises regions: an initial cone-shaped region 20, an intermediate region 21 and a main region 22 defined by the frontier of the jet, that is to say by the location of the points of zero velocity. In the principal zone, this frontier is bounded by an asymptotic curve 23 so that the jet may in this zone be regarded as identical to a cone of axis A and of angle a having its apex at a point on the axis A assimilated to a point at the source S. Within the meaning of the invention, $\alpha$ is defined as the angle of divergence of the jet and the maximum velocity of the jet in question is the velocity measured on the axis A at the height of the source S and two adjacent jets are considered as having combined when their respective frontiers intersect.

Figure 5:
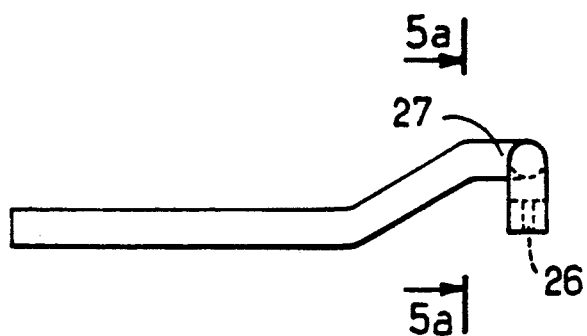
FIG. 5 is a cross-sectional view of a ring with nozzles, and also a vertical section (FIG. 5a)
Figure 5A:
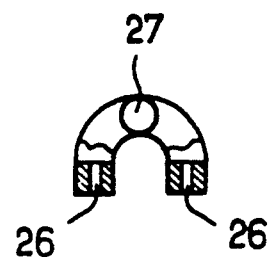
Figure 4:
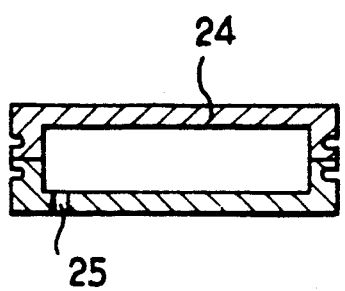
FIG. 4 is a cross-sectional view of a ring of the perforated annular tube type.
Figure 6:
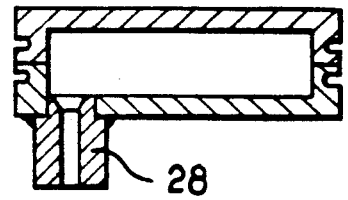

The blower ring according to the invention has been tested according to various alternative embodiments shown diagrammatically in FIGS. 4 to 6. FIG. 4 corresponds to a ring of the perforated annular tube type, constituted by a simple torus of rectangular cross-section 24 of which the bottom wall is pierced by a series of different orifices 25. The rings C1 and C2 correspond to this first type. FIGS. 5 and 5a show a ring having nozzles or more precisely twin nozzles as can be seen on the section 4a. This jet is thus produced by a nozzle 26 supplied by a tube 27. In contrast to the aforementioned case, the supply to each group of two nozzles is therefore individualised. The rings C4 and C5 correspond to this type.

Finally, FIG. 6 shows an alternative form of embodiment derived from FIG. 4 where a nipple 28 becomes seated opposite each orifice or hole. The ring C3 has been constructed according to this model. The characteristic features of the rings tested are as follows:

TABLE I

| Type | Number of holes | Distance between centres (mm) | Perforation (mm) | Ring (mm) |
| --- | --- | --- | --- | --- |
| C1 | 290 | 7.43 | 1.5 | 686 |
| C2 | 86 | 25 | 2.5 | 686 |
| C3 | 86 | 25 | 2.5 | 686 |
| C4 | 86 | 25 | 2.5 | 686 |
| C5 | 43 | 50.1 | 3 | 686 |

The ring C1 is a standard ring according to the teachings of patent U.S. Pat. No. 2,991,507. The ring C2 differs from the ring C1 solely by reason of the greater spacing between the holes, partly offset by an increase in the diameter of the orifices. The ring C3 is based on the ring C1, save that the orifices are replaced by nipples of stainless steel or any other non-ferromagnetic material welded to the ring and which advantageously guide the jet to a height of around 10 mm at least whereas in the case of a perforated annular tube, such guidance may be performed at most over a height corresponding to the thickness of the tube wall. Furthermore, with nipples, it is very easy to give a slight inclination to the jets in order to give them an orientation which is not parallel with the axis of the centrifuge. Finally, the rings C4 and C5 are rings which consist of a series of equidistant nozzles.

Hereinafter, unless otherwise indicated to the contrary, all the tests were conducted with a centrifuge 600 mm in diameter, with a perforation distribution based on the teachings of the patent FR-A-1 182 917 and the operating conditions described in the patent EP-A-91 866, particularly with regard to the glass compositions employed. The annular burner produces a gaseous jet of which the temperature at the burner lips is around 1430° C.-1450° C. The fineness of the fibres is determined by the value of their micronaire (F) under 5 g. The micronaire measurement also referred to as the "fineness index" takes into account the specific surface area thanks to measurement of the loss of aerodynamic charge when a given quantity of fibres extracted from an unsized mat is subjected to a given pressure of a gas—generally air or nitrogen. This measurement is normal in mineral fibre production units and is standardised (DIN 53941 or ASTM D 1448) and it employs a so-called "micronaire apparatus". The tests according to the invention were conducted with a SHEFFIELD machine type FAM 60 P. This machine comprises an inlet for air (or nitrogen) under pressure, a valve for regulating this pressure, a flow meter, a cylindrical chamber with a vertical axis with a gas inlet at the bottom. The weighed fibres (more often than not 5 grammes 0.01 g) are pressed into the bottom of the chamber by a calibrated plug which allows the gases to escape. A preliminary test makes it possible to adjust the rate of flow of air to a given value, always the same before commencing the fibre tamping test. Measurement of the micronaire or of the fineness index consists of recording the reading of the standard flow meter when the fibre is in place. To work within the same range of losses of charge, it is necessary to adapt the quantity of tested fibres by diminishing the mass when the diameter diminishes. It is therefore necessary to mention this as the same time as the result of the rate of flow. It must be noted that the finer the fibres the greater is their capacity to oppose passage of the gaseous current—and by correlation their insulating capacity—and therefore the smaller their micronaire will be.

In a first stage, these tests were conducted in the case of heavy product production, for which the demands of mechanical strength are at least as important as those which relate to insulating capacity. The tests were then conducted with a dynamic pressure of 32500 Pa at the level of the burner, for a centrifuge speed of 1450 revolutions per minute, producing fibres with a micronaire of 4 under 5 g. The density of the product is 84 kg/m$^3$ and their binder content is 6.8%.

TABLE II

| Ring type | air flow rate (m$^3$/h) | sag (mm) | tear rate (N/dm$^2$) | Compression (RPa) 25% | Aptitude for cutting | Lambda at 24° C. | Distribution (%) |
| --- | --- | --- | --- | --- | --- | --- | --- |
| C1 | 932 | 105 | 28 | 32 | bad | 32.5 | 75 |
| C1 | 630 | 101 | 55 | 29 | good | 32.5 | 84 |
| C2 | 823 | 107 | 40 | 32 | good | 32.8 | 88 |
| C2 | 560 | 115 | 42 | 33 | good | 32.7 | 97 |
| C3 | 750 | 105 | 67 | 36 | good | 32.8 | 84 |
| C3 | 550 | 85 | 56 | 37 | good | 32.5 | 97 |
| C4 | 750 | 105 | 55 | 30 | good | 32.8 | 88 |
| C4 | 540 | 102 | 62 | 29 | bad | 32.7 | 97 |
| C5 | 520 | 120 | 50 | 50 | average | 32.9 | 65 |
| C5 | 653 | 106 | 25 | 41 | average | 32.8 | 59 |

In these readings, the sag indicates the collapse of a 1.20 m panel resting simply on its longitudinal ends and the lower the reading the more the product will behave like a rigid panel which simplifies its installation. The term 'tear rate (in newtons per dm$^2$)' denotes the force which has to be exerted in order to tear off a strip of 1 dm$^2$ of products. The compression value (in kilo pascals), corresponds to the pressure which has to be exerted in order to reduce the thickness of the product by one quarter. The lambda thermal conductivity measured at 24° C. is given in watts per meter and by degrees centigrade (w/m° C). Finally, the distribution expresses the percentage of measurements for which the surface mass measured was equal to 10% for mean surface mass (here 2270 g/m$^2$, allowing for a thickness of 27 mm), each measurement being performed on a longitudinal strip of product, eight strips being needed to reconstitute the product in its initial width.

FIG. 7 makes it possible more clearly to visualise this gain with regard to distribution. There, too, the product has been cut into eight longitudinal strips and the surface mass of each was measured. The graphs in dotted lines correspond to products obtained with a type C1 ring. The graphs in continuous lines are obtained with type C3 rings. The irregularities from one strip to the other are less pronounced with the ring according to the invention.

It emerges from the foregoing table that in any case the rings according to the invention (C2 to C4) produce values which are at least equal to the values obtained with a standard ring, far better results being obtained with a ring which has nipples (C3), particularly with regard to the tearing strength and the figures for sag.

On the other hand, the results obtained with the C5 ring where the jets are still individualised long after passage below the centrifuge are poor. Another important aspect of the products according to the invention is the quite substantial reduction in the number of white spots, showing the more homogeneous nature of the sizing. It is therefore evident that by proceeding according to the invention, it is possible to obtain an effect of cutting of the fibre torus in relatively short tufts.

In a second stage, these tests related to a lightweight product obtained with a dynamic pressure at the burner level of 45500 Pa for a centrifuge speed of 1900 revolutions per minute. The surface mass is 880 g/m², the density 11 kg/m³, the micronaire F/5 g is 3.0 and the phenol-formaldehyde binder content 4.5%. This type of product is generally marketed in the form of rolls and is used for insulating vertical walls or lofts.

TABLE III

| Ring | $\Omega(m^3/h)$ | RT (gf/g) | RE (T · 6) | Lambda | Distribution |
|---|---|---|---|---|---|
| C1 | 480 | 250 | 139 | 45.8 | 94% |
| C2 | 602 | 265 | 139 | 45.3 | 88% |
| C2 | 334 | 266 | 138 | 45.1 | 81% |
| C3 | 557 | 246 | 138 | 45.8 | 94% |
| C3 | 317 | 260 | 138 | 45.2 | 91% |
| C4 |  | 232 | 140 | 45.8 | 88% |
| C5 |  | 228 | 131 |  |  |

In this table, RT refers to the resistance under traction here expressed in grams-force per gram, that is to say the force needed to break a specimen gripped at both ends by two jaws: RE corresponds to the resumption of thickness (expressed as a percentage) of a product compressed by a factor 6, the value 100 corresponds to the nominal thickness of the product, not to its effective thickness which explains why values in excess of 100 may be obtained in this instance. Thermal conductivity and distribution are expressed in the same units as in the previous example.

The values indicated here seem to show a very slight influence of the product on the blower ring. But it is worthwhile noting that all these figures are satisfactory with the exception of the ring in which the jets are at their origin spaced apart by 50 mm and therefore only merge far below the inductor.

Furthermore, the products according to the invention show a substantial reduction in the number of white spots. But even if in the case of lightweight products the results are not clearly improved this does clearly show a favourable effect. Furthermore, very advantageously, the products have been obtained by modifying only a few operating parameters compared with the previous example but with a strictly identical production line. The polyvalence of the line is therefore substantially enhanced due to the improvement found in the case of these heavy products.

It may finally be recalled that these blower rings according to the invention may likewise be used under very good conditions with somewhat different gaseous drawing conditions, for example with a drawing gas temperature of around 800° C. for a drawing gas current velocity of around 50 m/s, the centrifuge being in this case provided with rather smaller orifices than in the previous case mentioned in order to offset the relative reduction in drawing by the gaseous current.

We claim:

1. A method for forming fibers for inorganic thermoplastic fiber forming materials, comprising the steps of:
    pouring an inorganic plastic material in a liquid state into a centrifuge rotating about a substantially vertical axis, the centrifuge having a periphery pierced with a large number of orifices from which the material is sprayed in the form of filaments;
    providing a flow of hot gas at elevated temperature along the periphery of the centrifuge and in a distance transverse to the length of the filaments, whereby the filaments are entrained by the flow of gas and drawn out into fibers; and
    forming a flow of cold gas enveloping the drawn out fibers and channeling the flow of hot gas,
    wherein said step of forming a flow of cold gas comprises discharging divergent jets of cold gas in a downward direction, said jets converging into a continuous annular flow at a height immediately below a lowermost row of said orifices.

2. A method according to claim 1, wherein the jets converge approximately 20 mm below the lowest row of said orifices.

3. A method according to claim 1 or 2, wherein an emission velocity of the said jets is in excess of 250 m/s.

4. A method according to claim 2 including the step of heating the centrifuge by an electromagnetic inductor, wherein the jets converge at the height of the inductor.

5. An apparatus for forming fibers from inorganic thermoplastic fiber forming materials, comprising:
    a centrifuge rotatable about a substantially vertical axis and having a peripheral face perforated by a large number of orifices;
    an annular drawing burner positioned for producing a downward flow of hot gas past said peripheral face; and
    a blower ring positioned for producing a flow of cold gas concentric with said flow of hot gas,
    wherein said blower ring comprises means for generating individual divergent gaseous jets, which jets converge into a continuous annular flow at a height immediately below a lowermost row of said orifices,
    and wherein said means for generating comprise gas discharging elements spaced apart by a distance d, where $d = 2 \cdot h \cdot \tan \alpha$, in which $\alpha$ is the angle of divergence of the jets and h is a distance equal to between 1 and 2 times a distance between a discharge height of said elements and said lowermost row of said orifices.

6. An apparatus according to claim 5 wherein h=1.5 and 2 times the distance between the discharge height of said elements and said lowermost row of said orifices.

7. An apparatus according to claim 5, wherein h exceeds by about 20 mm the height between the discharge point of said elements and the lowermost row of orifices in the peripheral face.

8. An apparatus according to claim 5 wherein said blower ring comprises a perforated tubular ring.

9. An apparatus according to claim 5, wherein said blower ring comprises a tubular ring having nipples as said gas discharging elements.

10. An apparatus according to claim 8, wherein said gas discharging elements comprise a series of nozzles on said ring.

* * * * *